(12) United States Patent
Maeda

(10) Patent No.: US 12,174,794 B2
(45) Date of Patent: Dec. 24, 2024

(54) PROCESSING APPARATUS AND CONTROL METHOD THEREOF

(71) Applicant: CANON KABUSHIKI KAISHA, Tokyo (JP)

(72) Inventor: Tomoki Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 17/850,628

(22) Filed: Jun. 27, 2022

(65) Prior Publication Data

US 2022/0414058 A1 Dec. 29, 2022

(30) Foreign Application Priority Data

Jun. 29, 2021 (JP) ................................. 2021-108055

(51) Int. Cl.
*G06F 16/16* (2019.01)
(52) U.S. Cl.
CPC .......... *G06F 16/164* (2019.01); *G06F 16/162* (2019.01)
(58) Field of Classification Search
CPC ....... G06F 16/164; G06F 16/162; G06F 16/16
See application file for complete search history.

(56) References Cited

U.S. PATENT DOCUMENTS

| | | | | |
|---|---|---|---|---|
| 2009/0119251 A1* | 5/2009 | Ono | ...................... | G11B 27/002 |
| 2009/0161507 A1* | 6/2009 | Matshushita | ............ | G11B 19/02 |
| | | | | 369/47.5 |
| 2011/0096198 A1* | 4/2011 | Nosaka | ................... | H04N 5/772 |
| | | | | 348/E5.031 |
| 2011/0194834 A1* | 8/2011 | Motomura | ........... | G11B 27/105 |
| | | | | 386/248 |
| 2012/0082425 A1* | 4/2012 | Kishikawa | ........... | G11B 27/034 |
| | | | | 386/E5.069 |
| 2013/0336408 A1* | 12/2013 | Hosokawa | ............. | H04N 19/91 |
| | | | | 375/240.23 |
| 2020/0210753 A1* | 7/2020 | Sarubin | ................... | G06F 18/24 |

FOREIGN PATENT DOCUMENTS

JP 2011166542 A 8/2011

* cited by examiner

*Primary Examiner* — Maher N Algibhah
(74) *Attorney, Agent, or Firm* — Canon U.S.A., Inc. IP Division

(57) ABSTRACT

A processing apparatus includes a moving image file restoration unit configured to restore a moving image file and an additional information file restoration unit configured to restore an additional information file associated with the moving image file. The additional information file restoration unit starts restoration processing on the additional information file associated with the moving image file after the moving image file restoration unit starts restoration processing on the moving image file and before the restoration processing on the moving image file is completed. The moving image file restoration unit completes the restoration processing on the moving image file after the restoration processing on the additional information file is completed.

15 Claims, 9 Drawing Sheets

PROCESSING APPARATUS AND CONTROL METHOD THEREOF

BACKGROUND

Field of the Disclosure

The present disclosure relates to a processing apparatus that performs processing on a moving image file and an associated additional information file, and more particularly to a processing apparatus that restores a moving image file and an additional information file.

Description of the Related Art

There is demand for more quick and accurate information broadcasting from news sites such as broadcasting stations and new agencies than ever before with the recent rise of social networking services (SNS). Video processing devices such as digital still cameras and digital video camcorders help highly prompt report more quickly and easily with moving images and additional information files including various metadata regarding moving image files written therein. A captured moving image and various types of meta information such as the format and the recording length of the moving image are recordable as way of example. In addition, a user can write interview information such as the interview title and the interview location into an additional information file at the news site through communications between a mobile terminal and a digital video camcorder. Additional information files are used, for example, as information used in easier search of a moving image file server for a moving image file. In the search, the user can learn the format and the recording length of the moving image file by checking various types of meta information of the moving image file.

Japanese Patent Application Laid-Open No. 2011-166542 discusses a technique of temporarily storing the moving image data and its additional information in a media buffer and then writing them in a single file in a media in the temporarily stored order in response to when moving image data and additional information each reach the corresponding amount of predetermined data in an erase block unit of a storage medium. However, the additional information in the recorded single file becomes accessible if the moving image data is parsed. Under the circumstances, a technique is discussed of writing an additional information file in a file different from the moving image file in a versatile Extensible Markup Language (XML) format, providing easy check of the additional information and use of it in search for the moving image file.

On the other hand, some accident such as a power shut-off during the recording of a moving file or its additional information interrupts the recording, failing to write the recording length information about the moving image. The moving image file that suffers the interruption needs restoring with a function of restoring the moving image file. The restoration processing includes rewriting the recording length information, which is determined at the time of stopping the recording, and other information about both the moving image file and the additional information file.

An accident such as a power shut-off during the restoration of the moving image file and the additional information file can result in the completion of restoring the moving image file and leave the additional information file unrestored. The user can play the restored moving image file normally but cannot use the additional information file that has not been restored. In addition, the restoration of additional information files alone are not performed, which is unnecessary in general. However, that can lead to re-restoration of the moving image file, which has been restored, for the user to restore the additional information tile, resulting in an increase in operation of the user.

SUMMARY

In view of the above described issue, the present disclosure is directed to the provision of a processing apparatus that does not leave the additional information file alone to be restored while completing restoration of the moving image file in restoration processing on a moving image file and the additional information file.

According to an aspect of the present disclosure, a processing apparatus includes a moving image file restoration unit configured to restore a moving image file and an additional information file restoration unit configured to restore an additional information file associated with the moving image file. The additional information file restoration unit starts restoration processing on the additional information file associated with the moving image file after the moving image file restoration unit starts restoration processing on the moving image file and before the restoration processing on the moving image file is completed. The moving image file restoration unit completes the restoration processing on the moving image file after the restoration processing on the additional information file is completed.

Further features of the present disclosure will become apparent from the following description of exemplary embodiments with reference to the attached drawings.

DESCRIPTION OF THE EMBODIMENTS

Figure 1:
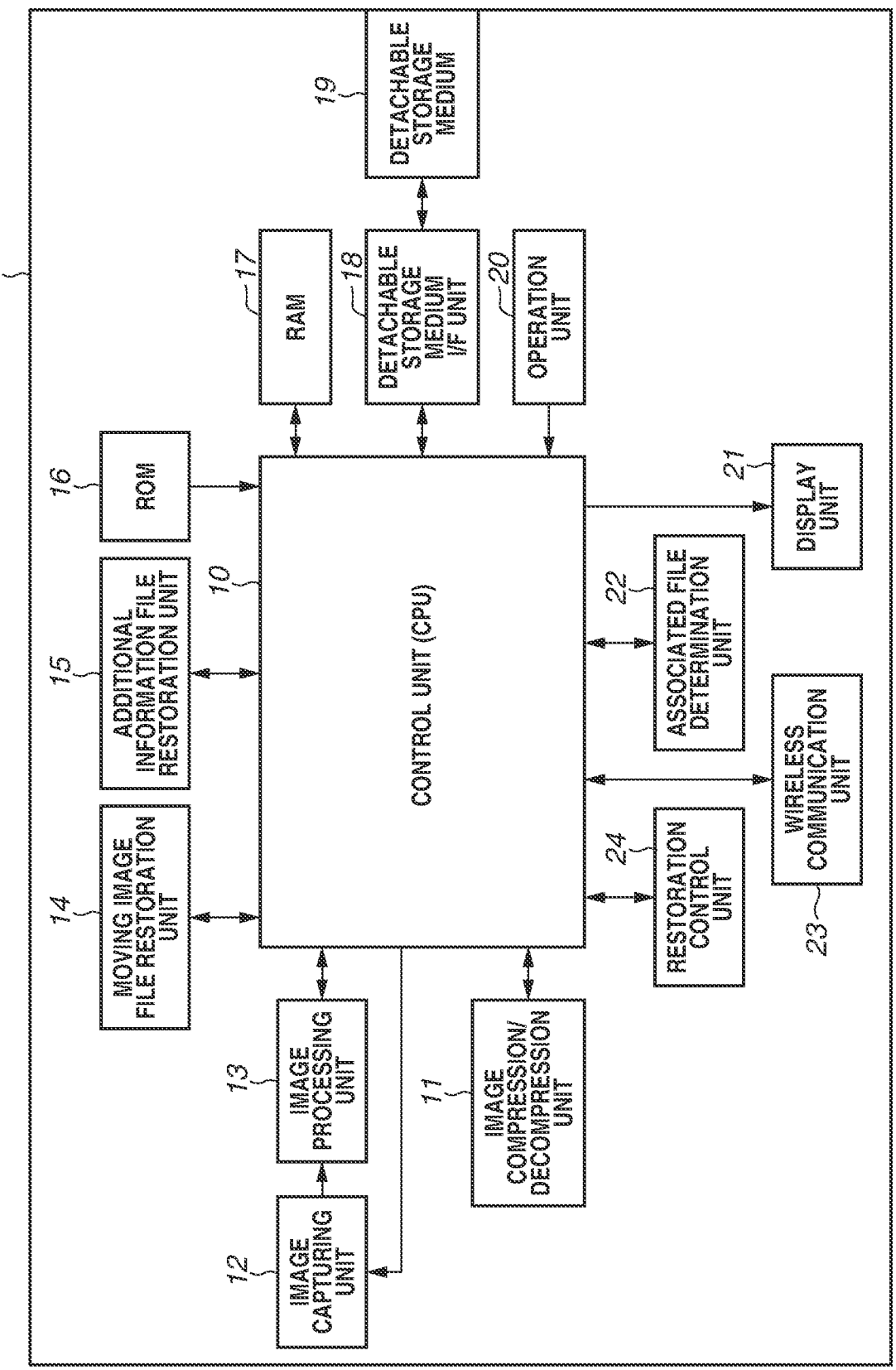
FIG. 1 is a block diagram illustrating a digital video camera.

A first exemplary embodiment will be described using a digital video camera as an example of a processing apparatus according to the present disclosure. FIG. 1 is a block diagram illustrating a digital video camera 100. A mobile terminal 200 that transmits an additional information file to the digital video camera 100 is used as way of example in the present exemplary embodiment.

In FIG. 1, the following units are connected to a control unit 10. The units include an image compression/decompression unit 11, an image capturing unit 12, an image processing unit 13, a moving image file restoration unit 14, an additional information file restoration unit 15, a read-only memory (ROM) 16, a random access memory (RAM) 17, a detachable storage medium interface (I/F) unit 18, an operation unit 20, a display unit 21, an associated file determination unit 22, a wireless communication unit 23, and a restoration control unit 24. The control unit 10 and the other individual units can communicate data with one another.

A detachable storage medium 19 for recording image data is attachable to the digital video camera 100. The digital video camera 100 includes an interface of the detachable storage medium I/F unit 18 for connecting to the detachable storage medium 19. The detachable storage medium I/F unit 18 has a slot into which the detachable storage medium 19 such as a memory card can be inserted, to be connected to and communicate with the detachable storage medium 19 put in the slot. FIG. 1 illustrates an example in which the detachable storage medium 19 is attached to the detachable storage medium I/F unit 18. The digital video camera 100 of FIG. 1 includes the detachable storage medium 19, but may include a storage medium that is not detachable and is built therein. Further, the digital video camera 100 is described as including a single detachable storage medium and recording image data on the single storage medium, but may include a plurality of detachable storage media attachable thereto to record image data on the plurality of detachable storage media.

The control unit 10 is a system control unit that performs general controls of the system of the digital video camera 100 and includes one or more processors. The control unit 10 reads programs recorded in the ROM 16, runs the read programs to control individual units to perform processing in flowcharts described below. The ROM 16 is a nonvolatile storage medium and stores programs to be run by the control unit 10. The RAM 17 is a volatile storage unit that is used as a work memory of the control unit 10. The RAM 17 temporarily stores image data that is captured by the image capturing unit 12 and is subjected to image processing by the image processing unit 13, image data read from the detachable storage medium 19, and other data. The RAM 17 is also used as a video random access memory (VRAM) for the image compression/decompression unit 11 to perform compression processing or decompression processing on image data and for the display unit 21 to display the image data. Further, the RAM 17 is used as a RAM for temporarily storing image data captured by the image capturing unit 12 and additional information to be recorded in association with the image data.

The image capturing unit 12 includes imaging lenses (including a zoom lens and a focus lens) and an image capturing device, captures images of objects based on control by the control unit 10, and acquires image data such as still image data and moving image data.

The image processing unit 13 performs pixel interpolation, resize processing, and color conversion processing on the image data captured by the image capturing unit 12. The image processing unit 13 further performs arithmetic processing using the captured image data, and the control unit 10 performs various types of control related to image capturing by the image capturing unit 12 (exposure control, automatic white balance control, and other controls) based on obtained arithmetic results.

The image compression/decompression unit 11 performs compression processing on the image data subjected to the image processing in the image processing unit 13 and decompression processing on the image data read from the detachable storage medium 19.

The moving image file restoration unit 14 performs restoration processing on a moving image file on which recording processing is incomplete and to be restored. Accidents such as a power shut-off and a detachment of the detachable storage medium 19 during the recording of a moving image file prevents normal completion of the recording the moving image file. For example, those prevent recording length information about the moving image data and other data from being written to the moving image file, resulting in an incomplete moving image file that becomes subject to restoration processing. Thus, the moving image file restoration unit 14 performs restoration processing on the moving image file subject to restoration processing in the detachable storage medium 19.

As with the moving image file, accidents such a power shut-off and a detachment of the detachable storage medium 19 from the detachable storage medium I/F unit 18 prevents the additional information file restoration unit 15 from normally completing recording of an additional information file. For example, those prevent the recording length information and other information from being written to the additional information file, resulting in an incomplete additional information file that becomes subject to restoration processing. Thus, the additional information file restoration unit 15 restores the additional information file subject to restoration processing in the detachable storage medium 19.

The operation unit 20 includes a power supply switch for supplying the power to the digital video camera 100, an imaging start button, and a restoration start button and receives various operations from a user. If the operation unit 20 includes a touch panel, the control unit 10 can detect user operations on the touch panel. Examples of the touch panel used here are any of various types of touch panels such as a resistive film type, a capacitance type, a surface acoustic wave type, an infrared type, an electromagnetic induction type, an image recognition type, and an optical sensor type.

The display unit 21 is a display for displaying various setting states, an image captured by the image capturing unit 12 as a live image, and an image read and reproduced from the detachable storage medium 19, based on control by the control unit 10. Examples of the display unit 21 here include a display in a finder for looking it into and a vari-angle liquid crystal monitor.

The associated file determination unit 22 is a determination unit that determines whether the moving image file and the additional information file in the detachable storage medium 19 attached to the detachable storage medium I/F unit 18 are associated with each other based on whether the file names excluding the extensions matches with each other.

The wireless communication unit 23 transmits and receives data to and from an external device such as the mobile terminal 200, an external camera, and a personal computer through wireless communication based on control by the control unit 10. The wireless communication unit 23 transmits setting information, operation information, a live image, a captured image, and the like from the digital video camera 100. Further, the wireless communication unit 23 receives commands to operate the digital video camera 100, the additional information to be recorded together with the image data, and others from the external device. The restoration control unit 24 controls restoration processing on the moving image file at the moving image file restoration unit 14 and restoration processing on the additional information file at the additional information file restoration unit 15. Specifically, the restoration control unit 24 controls the order of restoration processing on a moving image file subject to restoration to which the recording length information and the like have not been written as above-described and restoration processing on the additional information file subject to restoration to which the recording length information has not been written as with the moving image file. In response to when the operation unit 20 receives an instruction to restore the moving image file from a user, the restoration control unit 24 controls the moving image file restoration unit 14 and the additional information file restoration unit 15 to restore the moving image file and the additional information file subject to restoration in the detachable storage medium 19. First, the restoration control unit 24 instructs the moving image file restoration unit 14 to start restoration processing on the moving image file and temporarily stores the header of the restored moving image file including the recording length information into the RAM 17. Next, before completing the restoration processing on the moving image file, the restoration control unit 24 instructs the additional information file restoration unit 15 to restore the additional information file. If the restoration processing on the additional information file is completed, the moving image file restoration unit 14 writes the header of the moving image file stored in the RAM 17 to the detachable storage medium 19, which completes the restoration processing on the moving image file. The restoration processing will be described in detail below with reference to a flowchart in FIG. 4.

The control unit 10 and the restoration control unit 24 have been describe as separated units, but the restoration control unit 24 is a part of the control unit 10 and performs control based on programs read from the ROM 16. In addition, the moving image file restoration unit 14 and the additional information file restoration unit 15 may also be integrated, and the restoration control unit 24 (the control unit 10) may carry out the functions of the moving image file restoration unit 14 and the additional information file restoration unit 15.

Figure 2:
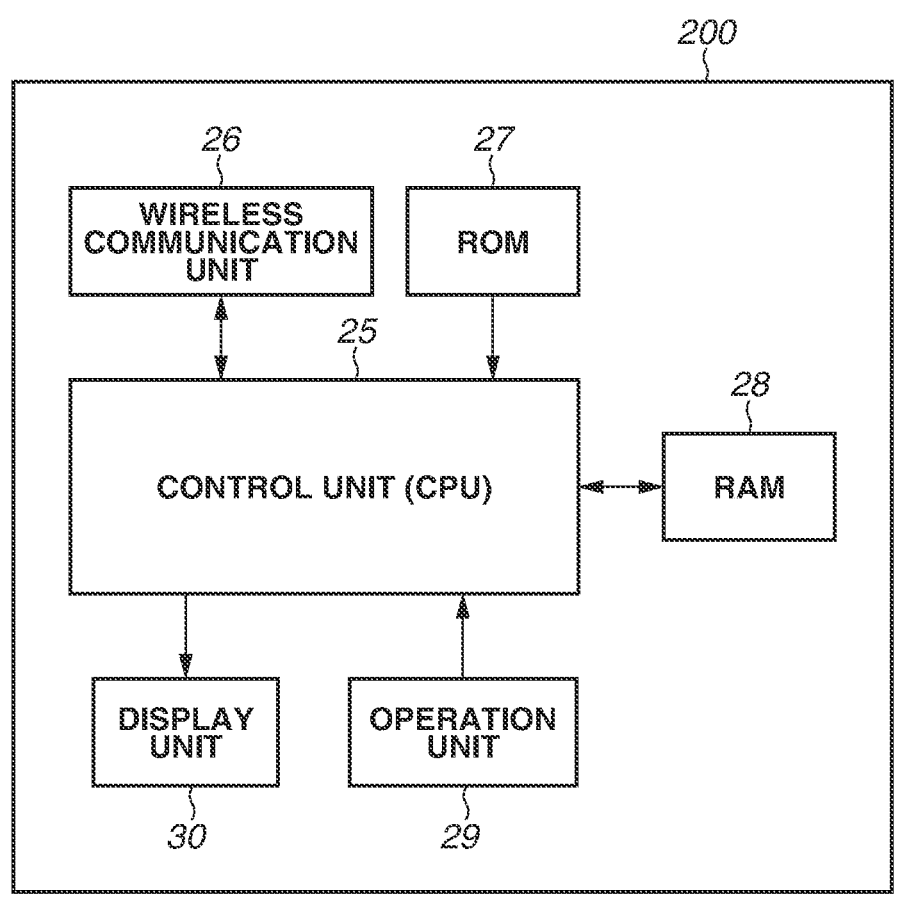
FIG. 2 is a block diagram illustrating a mobile terminal.

FIG. 2 is a block diagram illustrating the mobile terminal 200. The following units are connected to a control unit 25. The units include a wireless communication unit 26, a ROM 27, a RAM 28, an operation unit 29, and a display unit 30. The control unit 25 and the individual units can communicate data with one another.

The control unit 25 is a system control unit that performs general controls of the system of the mobile terminal 200. The control unit 25 loads programs recorded in the ROM 27 to the RAM 28, runs the programs to control the individual units to perform processing in the flowcharts described below. The ROM 27 is a nonvolatile storage medium and stores programs to be run by the control unit 25. The RAM 28 is a volatile storage medium that is used as a work memory of the control unit 25.

The wireless communication unit 26 transmits and receives data to and from an external device such as an external camera (the digital video camera 100) and a personal computer through wireless communication based on control by the control unit 25. The wireless communication unit 26 can receive data such as the setting information and the operation information of the digital video camera 100, and a live view image and the images captured by the digital video camera 100. Further, the wireless communication unit 26 can transmit commands to operate the digital video camera 100, the additional information to be recorded together with the image data, and other information to the digital video camera 100.

The operation unit 29 is an operation unit that receives operations from a user such as a power supply switch for supplying the power to the mobile terminal 200. The operation unit 29 includes a touch panel as with the operation unit 20.

The display unit 30 is a display for displaying various setting states and data received from the external device via the wireless communication unit 26 based on control by the control unit 25.

Figure 3:
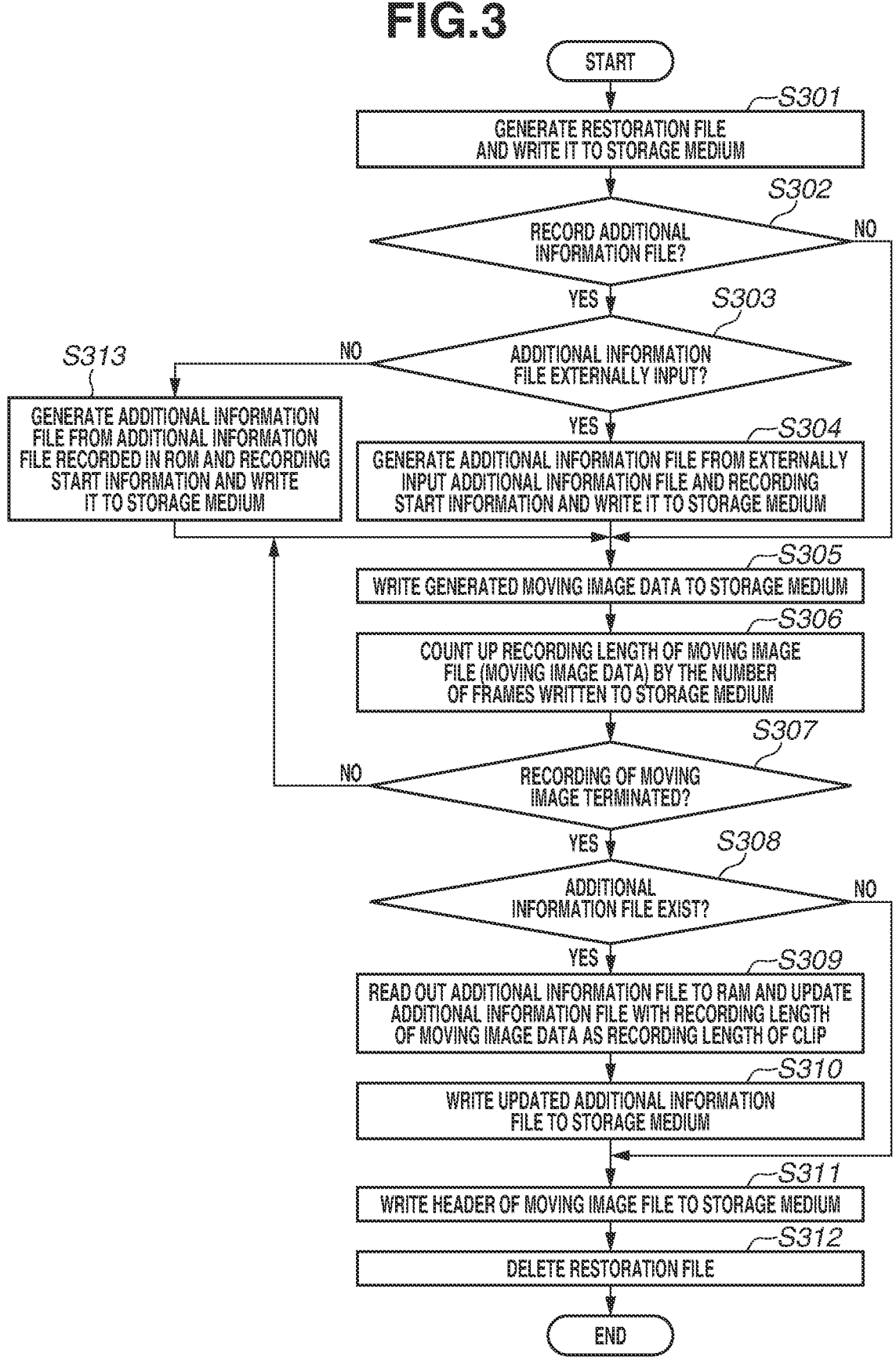
FIG. 3 is a flowchart illustrating recording processing according to one or more aspects of the present disclosure.
Figure 4:
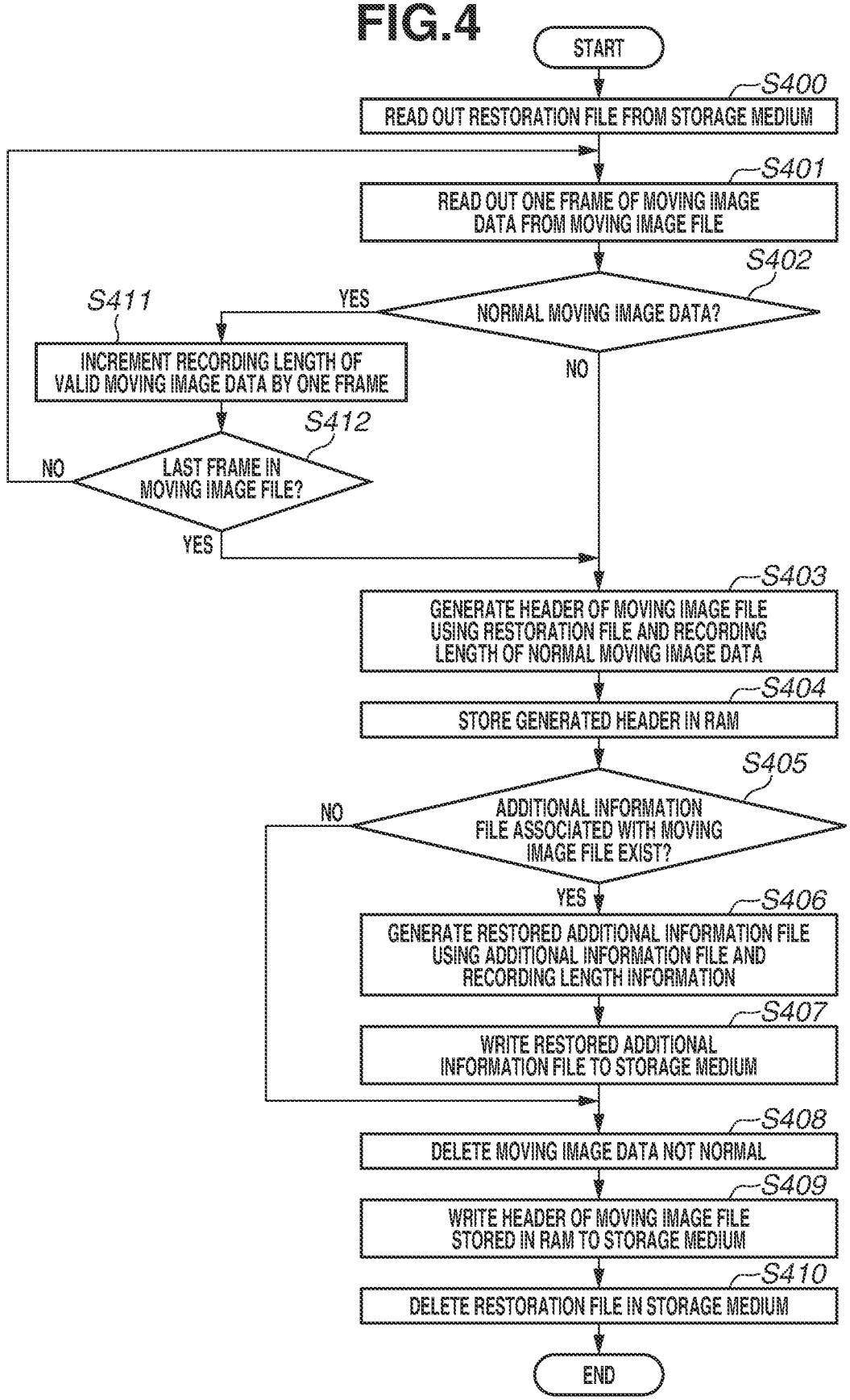
FIG. 4 is a flowchart illustrating restoration processing according to one or more aspects of the disclosure.

FIGS. 3 and 4 illustrate flowcharts according to the present exemplary embodiment. The processing in the flowcharts in FIGS. 3 and 4 is performed by the control unit 10 (or the restoration control unit 24) included in the digital video camera. 100 reading programs stored in the ROM 16, loading them in the RAM 17, and running them.

FIG. 3 illustrates a flowchart of a processing procedure in recording of the moving image file and the additional information file. In response to when a moving image recording start button included in the operation unit 20 is operated by a user, that brings the digital video camera 100 into a moving image recording start state, and the processing of FIG. 3 is started.

If the moving image recording start button is operated, in step S301, the control unit 10 generates a restoration file that stores data for the restoration processing, and writes the restoration file to the detachable storage medium 19 in case the recording of the moving image file is not normally completed.

Figure 5:
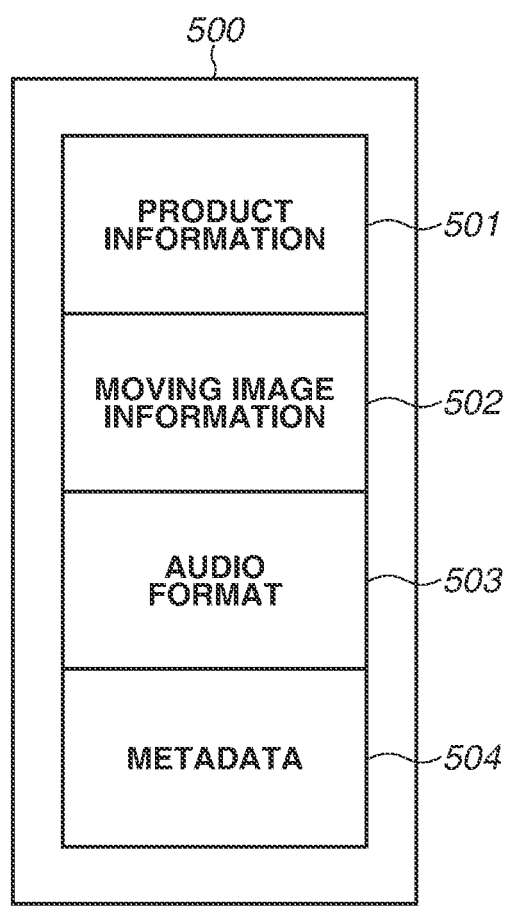
FIG. 5 illustrates the structure of a restoration file according to one or more aspects of the disclosure.

A restoration file 500 will be described with reference to FIG. 5. The restoration file 500 includes product information 501, moving image information 502, audio format information 503, and metadata. 504 about the moving image tile (data) to be recorded in the header of the moving image file. The product information 501 is information about the digital video camera 100 that has captured the moving image data. The moving image information 502 is information about an imaging setting of a moving image such as the frame rate of the moving image data, and the audio format information 503 is information about the format of audio data to be recorded together with the moving image data. (video data). The metadata 504 is information such as the imaging start date and time of the moving image file. The moving image file according to the present exemplary embodiment is a Moving Picture Experts Group-4 (MP4) file, and the product information 501, the moving image information 502, the audio format information 503, and the metadata 504 are not recorded at the time of starting the recording of the moving image file. Then, at the time of completing the recording of the moving image data (video and audio), the product information 501, the moving image information 502, the audio format information 503, the metadata 504, and a header including recording length information about the length of the moving image data are recorded in the moving image file. Thus, if an accident such as a power shut-off occurs during the recording of the moving image data, the product information 501, the moving image information 502, the audio format information 503, and the metadata 504 are not recorded, which prevents the restoration processing from being performed. Thus, according to the present exemplary embodiment, the restoration file 500 including the product information 501, the moving image information 502, the audio format information 503, and the metadata 504 is recorded as a file different from the moving image file in the detachable storage medium 19 at the time of starting the recording of the moving image file. In restoration performed due to a power shut-off or other causes during the recording of the moving image data, use of the pieces of restoration data (501 to 504) in the restoration file 500 allows the moving image file restoration unit 14 to perform restoration.

Next, in step S302, the control unit 10 determines whether to record the additional information file in association with the moving image file. It is determined to record the additional information file if, for example, a user has made a setting to record the additional information file via the operation unit 20. If it is determined to record the additional information file (YES in step S302), the processing proceeds to step S303; otherwise (NO in step S302), the processing proceeds to step S305.

In step S303, the control unit 10 determines whether the additional information file is input from the mobile terminal 200 via the wireless communication unit 23. It is determined that the additional information file is input if, for example, the additional information file is received from the mobile terminal 200 via the wireless communication unit 23 before capturing of a moving image is started. If it is determined that the additional information file is input (YES in step S303), the processing proceeds to step S304; otherwise (NO in step S303), the processing proceeds to step S313.

Figure 6:
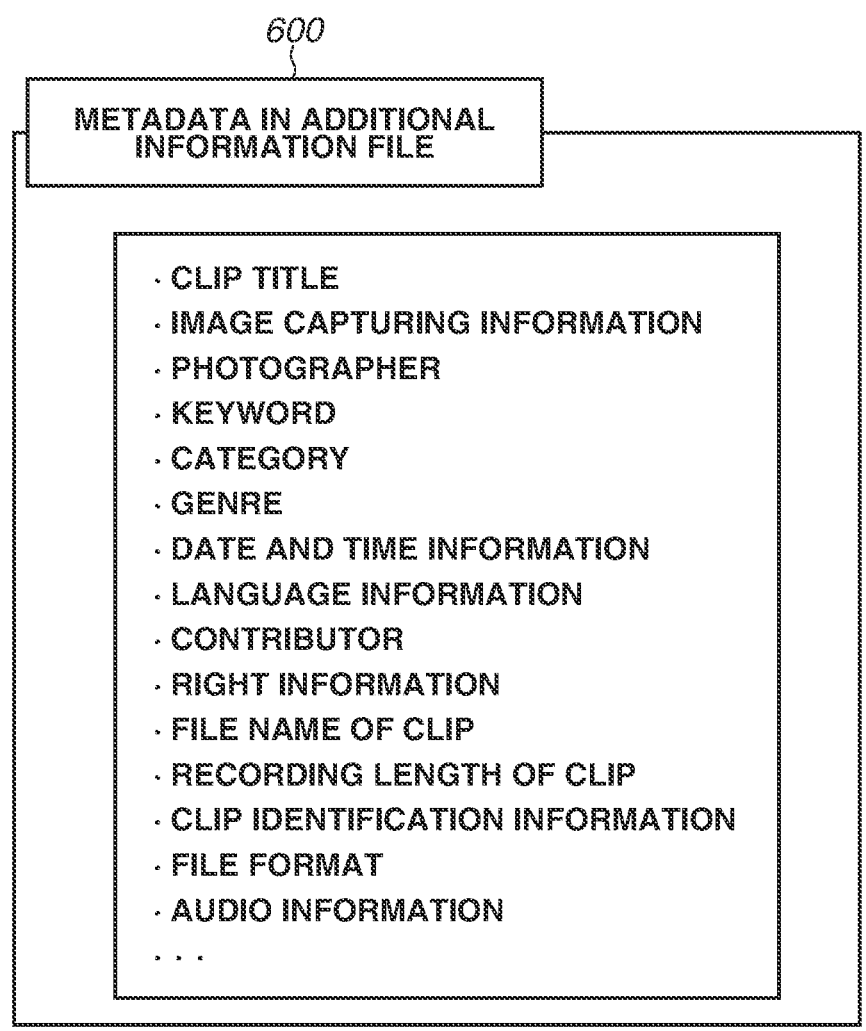
FIG. 6 illustrates the structure of an additional information file.

In step S304, the control unit 10 generates an additional information file illustrated in FIG. 6 from the additional information file received from the mobile terminal 200 via the wireless communication unit 23 and recording start information including a recording format, which is determined at the start of recording. The additional information file according to the present exemplary embodiment is a file described in an Extensible Markup Language (XML) format. The additional information file is also a file in which the additional information is described in a NewsML-G2 format standardized by International Press Telecommunications Council (IPTC). As illustrated in FIG. 6, the additional information file 600 includes information such as a clip title, image capturing information, a photographer, a keyword, a category, a genre, date and time information, language information, a file name of the clip, the recording length of the clip, clip identification information, and a file format. However, the recording length of the clip, namely, the length of the moving image data (the recording length) is determined at the end of the recording, which thus is not determined at the start of the recording. In step S304, the additional information file is generated without recording the recording length of the clip or with a recording length of zero or it left blank and is recorded in the detachable storage medium 19.

In step S313, the control unit 10 generates an additional information file from not the additional information file input from the mobile terminal 200 but the additional information file recorded in the ROM 16 and the recording start information including the recording format, which is determined at the start of the recording, and writes the generated additional information file to the detachable storage medium 19. In step S313, as in step S304, the additional information file is generated without recording the recording length of the clip or with a recording length of zero and is recorded in the detachable storage medium 19.

In step S305, the control unit 10 writes the moving image data generated using the image compression/decompression unit 11, the image capturing unit 12, and the image processing unit 13 to the detachable storage medium 19. In step S306, the control unit 10 counts up the recording length of the moving image data by the number of frames written in the processing in step S305.

In step S307, the control unit 10 determines whether the recording of the moving image is terminated. It is determined that the recording of the moving image is terminated if, for example, the stop of the recording of the moving image data is instructed by a recording stop button included in the operation unit 20, and the recording of the moving image data captured by the time when the instruction to stop the recording is input, to the detachable storage medium 19, is completed. If the control unit 10 determines that the recording of the moving image is not terminated (NO in step S307), the processing proceeds to step S305. If the control unit 10 determines that the recording of the moving image is terminated (YES in step S307), the processing proceeds to step S308.

In step S308, the control unit 10 determines whether the additional information file associated with the moving image data that is written to the detachable storage medium 19 in step S305 is present. It is determined that the additional information file exists if, for example, the additional information file of which the file name excluding an extension matches that of the moving image data written to the detachable storage medium 19 in step S305. Alternatively, since the additional information file exists if it is determined to record the additional information file in step S302, it may be determined whether to record the additional information file as in step S302, or a determination result in step S302 may be stored. If the control unit 10 determines that the additional information file exists (YES in step S308), the processing proceeds to step S309; otherwise (NO in step S308), the processing proceeds to step S311.

In step S309, the control unit 10 reads the additional information file that is written to the detachable storage medium 19 in step S304 or S313 to the RAM 17. Then, the control unit 10 updates the additional information file in the RAM 17 so that the recording length that is counted up in step S306 is stored as the recording length of the clip in the additional information file illustrated in FIG. 6. The recording length that is counted up in step S306 is the number of frames of the moving image data recorded in the moving image file, and thus it is the recording length information indicating the length of the moving image data.

In step S310, the control unit 10 writes the additional information file that is stored in the RAM 17 and updated in step S309 to the detachable storage medium 19.

In step S311, the control unit 10 generates the header of the moving image file from various information stored in the RAM 17 and writes the header to the detachable storage medium 19.

In step S312, the control unit 10 deletes the restoration file written to the detachable storage medium 19 in step S301 from the detachable storage medium 19. If the processing in step S312 is completed, the recording of the moving image file and the additional information file is terminated.

FIG. 4 illustrates a flowchart of a processing procedure of performing restoration of the moving image file and the additional information file. In response to when the restoration start button included in the operation unit 20 is operated by a user, the control unit 10 (the restoration control unit 24) starts the processing in FIG. 4. According to the present exemplary embodiment, a user selects a restoration target moving image file and then presses the restoration start button, and in FIG. 4, restoration processing is performed on the restoration target moving image file selected by the user. However, the control unit 10 (the restoration control unit 24) may identify the moving image file to be restored and perform the processing in FIG. 4 on the moving image file identified as a restoration target without a user's selection of the restoration target moving image file. The digital video camera 100 according to the present exemplary embodiment performs the restoration processing on the moving image file and the additional information file if a user selects the restoration target moving image file and issues an instruction on the restoration processing, and the restoration processing on the additional information file alone cannot be instructed.

First, in step S400, the restoration control unit 24 causes the moving image file restoration unit 14 to start the restoration processing on the moving image file. Then, the moving image file restoration unit 14 reads the restoration file that corresponds to the moving image file as the restoration target and is recorded at the time of recording the moving image (capturing the moving image) in step S301 from the detachable storage medium 19.

Next, in step S401, the moving image file restoration unit 14 reads one frame of the moving image data from the restoration target moving image file in the detachable storage medium 19.

In step S402, the moving image file restoration unit 14 determines whether the one frame of the moving image data read in step S401 is normal moving image data (valid moving image data). It is not determined to be the normal moving image data if, for example, the one frame of the moving image data cannot be read. If the moving image file restoration unit 14 determines the one frame of the moving data to be normal moving image data (YES in step S402), the processing proceeds to step S411; otherwise (NO in step S402), the processing proceeds to step S403.

In step S411, the moving image file restoration unit 14 increments the recording length (the number of frames) by one frame in order to count the number of frames of the normal moving image data. According to the present exemplary embodiment, the recording length is incremented by one frame, but a method of adding the recording length for each certain unit such as adding the recording length for each group of pictures may be used.

In step S412, the moving image file restoration unit 14 determines whether the one frame of the moving image data read in step S401 is the last frame in the moving image file. It is determined to be the last frame of the moving image file if, for example, the value obtained by adding the size of one frame to the read file size exceeds the size of the moving image file. If the moving image file restoration unit 14 determines the one frame of the moving image file to be the last frame (YES in step S412), the processing proceeds to step S403. Otherwise (NO in step S412), the processing proceeds to step S401, and the processing in step S401 and subsequent steps is carried out for the next frame.

In step S403, the moving image file restoration unit 14 generates the header of the restoration target moving image file using the restoration file read in step S400 and the recording length (the number of frames) of the normal moving image data incremented in step S411. Specifically, the moving image file restoration unit 14 generates the header of the moving image file by adding (updating) the recording length (the number of frames) of the normal moving image data to a storage area that stores the recording length of the restoration file read in step S400.

In step S404, the moving image file restoration unit 14 stores the header of the moving image file generated in step S403 in the RAM 17. At this point of time, the restoration control unit 24 does not record the header generated by the moving image file restoration unit 11 in step S403 in the detachable storage medium 19 but temporarily stores the header in the RAM 17.

In step S405, the restoration control unit 24 causes the associated file determination unit 22 to determine whether the additional information file associated with the restoration target moving image file exists in the detachable storage medium 19. As described above, the associated file determination unit 22 determines that the additional information file exists if the additional information file is present of which the file name excluding the extension matches that of the restoration target moving image file, if it is determined that the additional information file exists (YES in step S405), the restoration control unit 24 advances the processing to step S406 to carry out the restoration processing on the additional information file. Otherwise (NO in step S405), the restoration control unit 24 advances the processing to step S408 to carry out the restoration processing on the moving image file.

In step S406, the additional information file restoration unit 15 reads the additional information file that is identified as being associated with the moving image file by the associated file determination unit 22 from the detachable storage medium 19. Then, the additional information file restoration unit 15 generates a restored additional information file using the read additional information file and the recording length information about the header of the moving image file stored in the RAM 17 in step S404. The additional information file restoration unit 15 generates the restored additional information file by storing the recording length of the header of the moving image file into the recording length of the clip in the additional information file.

In step S407, the additional information file restoration unit 15 writes the additional information file generated in step S406 to the detachable storage medium 19. At the time of writing, the additional information file restoration unit 15 overwrites original additional information file (before restoration) with the restored additional information. As described above, in steps S406 and S407, the restoration processing on the additional information file is carried out by the additional information file restoration unit 15, and in step S407, the restored additional information file is recorded in the detachable storage medium 19, which completes the restoration processing on the additional information file.

In step S408, the moving image file restoration unit 14 deletes the moving image data after the frame determined not to be normal in step S402 from the moving image file in the detachable storage medium 19.

In step S409, the moving image file restoration unit 14 writes the header of the moving image file stored in the RAM 17 in step S404 as the header of the restoration target moving image file to the detachable storage medium 19. In step S409, the header generated in the restoration processing is recorded as the header of the moving image file in the detachable storage medium 19, which means that the moving image file in the detachable storage medium 19 is restored.

In step S410, the moving image file restoration unit 14 deletes the restoration file in the detachable storage medium 19 from the detachable storage medium 19. This processing completes the restoration processing on the moving image file.

As described above, the restoration processing on the moving image file and the additional information file according to the present exemplary embodiment is started by the moving image file restoration unit 14 carrying out the restoration processing on the moving image file in step S100. Then, if the additional information file is recorded in the detachable storage medium 19, while the header of the moving image file generated by the restoration processing on the moving image file is not recorded immediately in the moving image file, the additional information file restoration unit 15 carries out the restoration processing on the additional information file (in steps S406 and S407). In other words, after the restoration processing on the moving image file is started, the additional information file restoration processing is carried out before the restoration processing on the moving image file is completed. After completing the additional information file restoration processing, the header generated by the moving image file restoration processing is recorded in the detachable storage medium 19 for the restoration of the moving image file. Since the restoration file in which data for the restoration processing is recorded is no longer needed, the restoration file is deleted from the detachable storage medium 19, which completes the restoration processing on the moving image file.

According to the present exemplary embodiment, the additional information file restoration processing uses information about the recording length of the moving image data about the restored moving image file, so that the restoration processing on the moving image file is started first. The additional information file restoration processing can be performed after the moving image file restoration processing is completed. However, an accident such as a power shut-off during the restoration processing on the additional information file causes the additional information file not to be restored while the moving image file is restored, which can be played normally. To avoid such an issue, according to the present exemplary embodiment, the restoration processing on the moving image file is completed after the restoration processing on the additional information file is completed, which leads to the restoration of the additional information file in the restored state when the moving image file is restored.

According to the present exemplary embodiment, the header of the moving image file is generated in step S403, the generated header is stored in the RAM 17 in step S404, and the restoration processing on the additional information file is performed before the generated header is recorded in the moving image file. However, instead of generating the header and recording it in the RAM 17, the information about the recording length alone may be stored in the RAM 17, and the header may be generated as in the processing in step S404 after the restoration processing on the additional information file is performed.

A second exemplary embodiment will be described. A basic configuration of a digital video camera 100 according to the second exemplary embodiment is similar to that of the digital video camera 100 according to the first exemplary embodiment, thus the description thereof will be omitted. According to the first exemplary embodiment, a moving image file in a format such as MP4 is used. According to the second exemplary embodiment, a moving image file in a format such as a Material Exchange Format (MXF) file is used.

Figure 7:
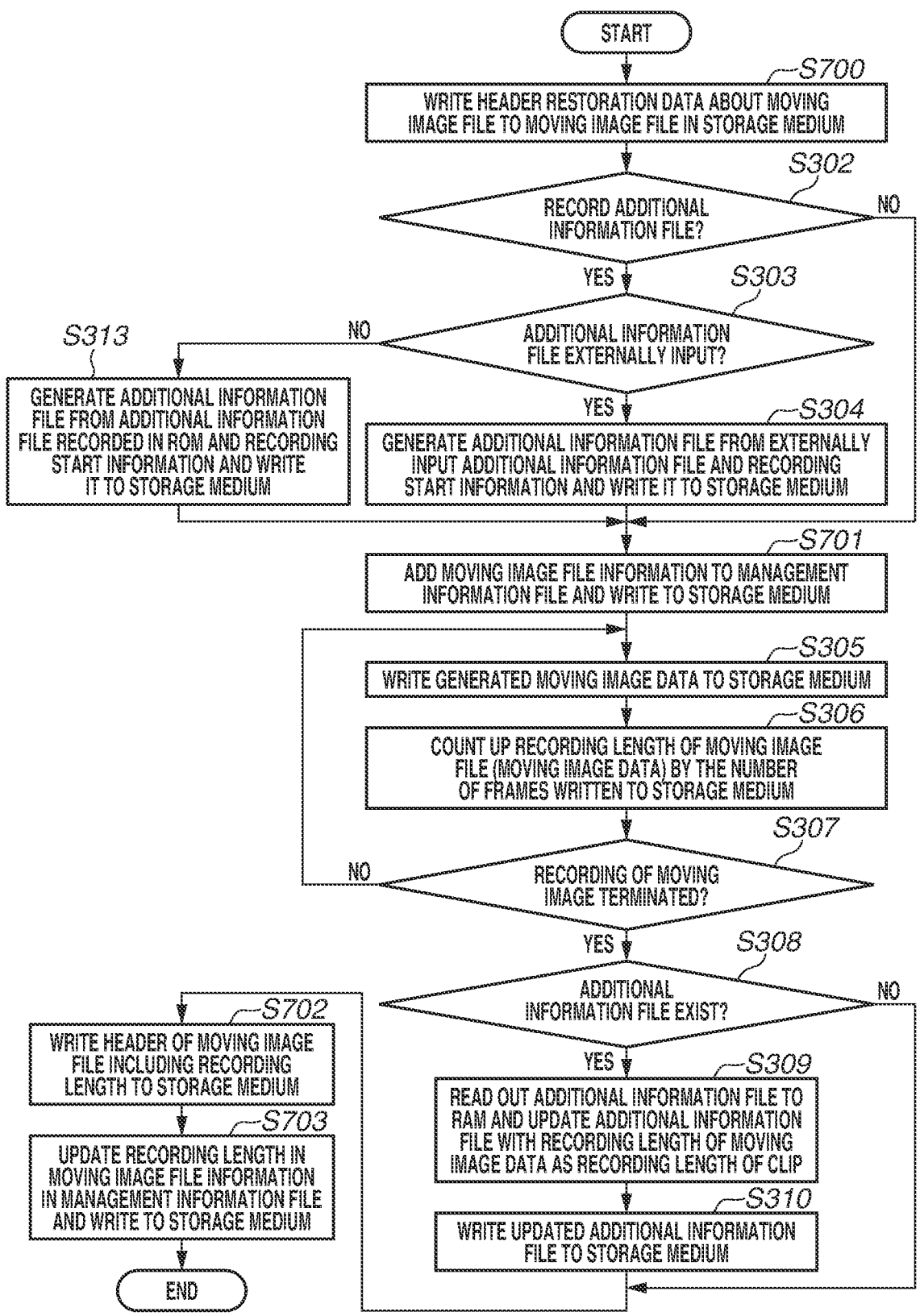
FIG. 7 is a flowchart illustrating recording processing according to one or more aspects of the disclosure.
Figure 8:
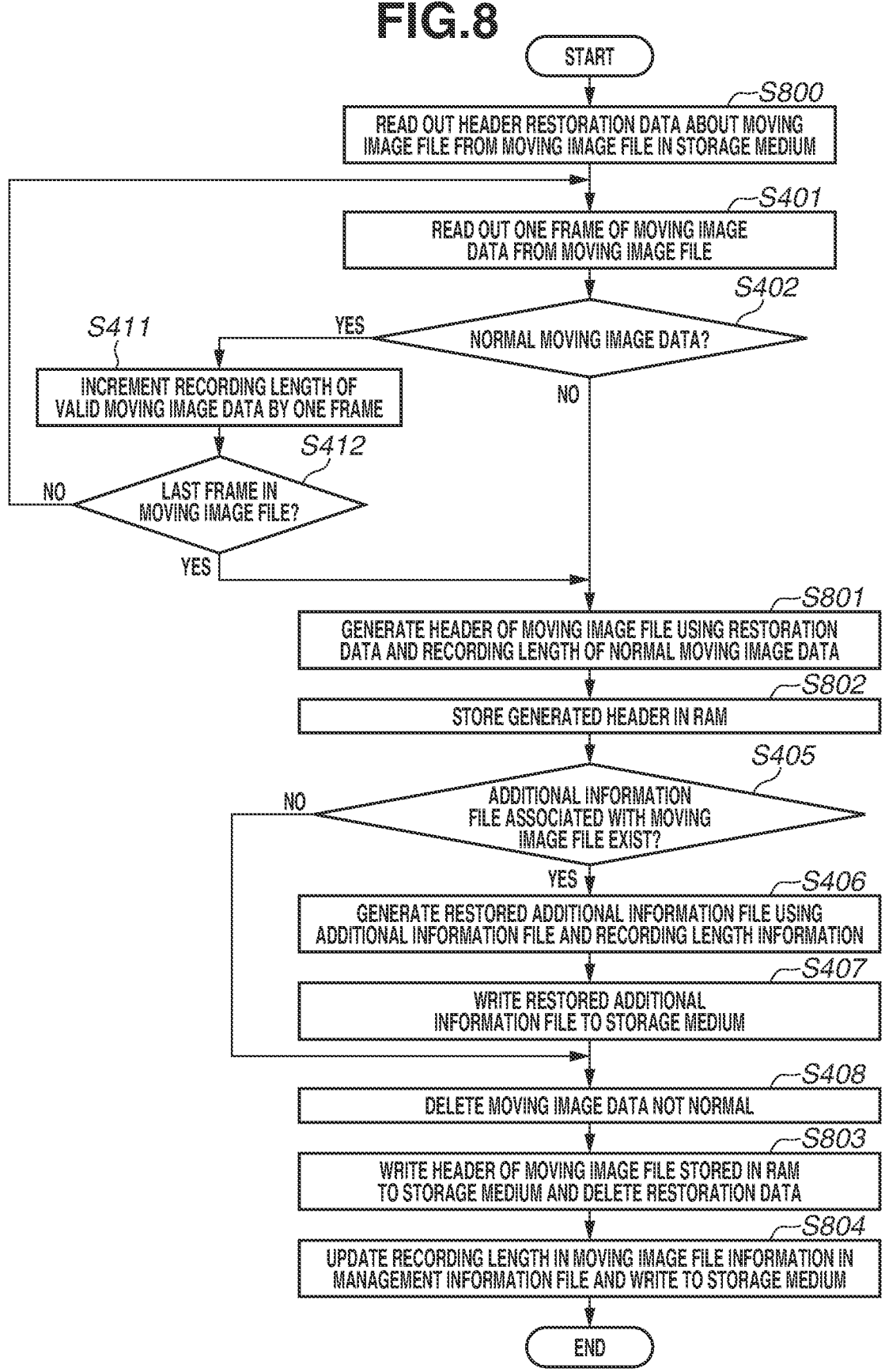
FIG. 8 is a flowchart illustrating restoration processing according to one or more aspects of the disclosure.

FIGS. 7 and 8 illustrate flowcharts of processing by the digital video camera 100 according to the present exemplary embodiment. The processing in the flowcharts in FIGS. 7 and 8 is carried out by the control unit 10 controlling the individual units by reading programs stored in the ROM 16 and loading the programs in the RAM 17 and performing various types of arithmetic processing.

FIG. 7 is a flowchart of a processing procedure of carrying out recording processing on a moving image file and an additional information file. Like numbers in the flowchart in FIG. 3 refer to like steps in the processing. As with the first exemplary embodiment, if the moving image recording start button included in the operation unit 20 is operated by a user, the digital video camera 100 is in the moving image recording start state, and the recording processing in FIG. 7 is started.

First, in step S700, the control unit 10 writes restoration data including data for the restoration processing to the detachable storage medium 19 in case the recording of the moving image file fails to be normally completed.

Figure 9:
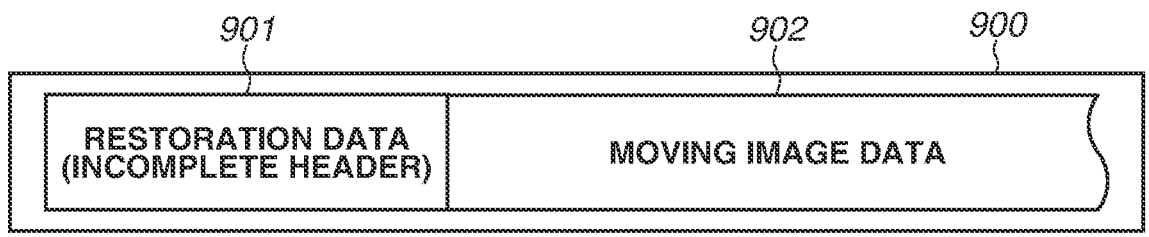
FIG. 9 illustrates the structure of a restoration file according to one or more aspects of the disclosure.

FIG. 9 illustrates the structure of a moving image file during recording according to the present exemplary embodiment. In the moving image file 900 (an MXF file) according to the present exemplary embodiment, the restoration data 901 is recorded in the header of the moving image file at the time of starting recording, and subsequently the moving image data 902 obtained through capturing is recorded. The restoration data 901 is basically the header of the moving image file 900, but information to be recorded in the header includes information (the recording length of the moving image data) to be recorded at the time of completing the recording of the moving image data. Thus, at the start of recording the moving image file 900, not a complete header but data in which part of the information (the recording length) is not recorded is recorded, According to the present exemplary embodiment, an incomplete header of the moving image file 900 that is recorded in the detachable storage medium 19 at the start of the recording is referred to as restoration data 901.

Next, the control unit 10 performs the processing in steps S302, S304, and S313. The processing in these steps is similar to that according to the first exemplary embodiment.

In step S701, the control unit 10 adds information about the moving image file that is started to be recorded to a management information file recorded in the detachable storage medium 19 and writes the management information file to the detachable storage medium 19. The management information file is different from the moving image file and the additional information file.

Next, the control unit 10 performs the processing in steps S305 to S311. The processing in these steps is similar to that according to the first exemplary embodiment.

In step S702, the control unit 10 generates the header of the moving image file including the recording length (the number of frames) of the moving image data and records it as the header of the moving image file. The incomplete header that does not include the recording length information at the start of recording is replaced with the header including the recording length information in this processing, which completes the recording of the moving image file.

In step S703, the control unit 10 updates the recording length information in the moving image file information in the management information file, writes the management information file to the detachable storage medium 19, which terminates the recording processing of the moving image file and the additional information file.

FIG. 8 is a flowchart of a processing procedure of carrying out restoration of the moving image file and the additional information file. Basic processing is similar to that according to the first exemplary embodiment, so that like numbers in the processing in the flowchart in FIG. 4 according to the first exemplary embodiment refer to like steps, and the description thereof will be omitted. As with the first exemplary embodiment, if the restoration start button included in the operation unit 20 is operated by a user, the control unit 10 (the restoration control unit 24) starts the processing in FIG. 8.

First, in step S800, the restoration control unit 24 causes the moving image file restoration unit 14 to start the restoration processing on the moving image file. Then, the moving image file restoration unit 14 reads the restoration data in the restoration target moving image file recorded in step S700 at the time of recording the moving image (at the time of capturing the moving image) from the detachable storage medium 19. This processing corresponds to the processing in step S400 in FIG. 4, but according to the present exemplary embodiment, the restoration data is recorded in the restoration target moving image file and thus is read from the restoration target moving image file.

Next, the restoration control unit 24 and the moving image file restoration unit 14 perform the processing in steps S401, S402, S411, and S412. The details of the processing is similar to those of the processing in FIG. 4. Further, in step S402, if the one frame of the moving image data is determined not to be normal moving image data (NO in step S402) or, in step S412, the one frame of the moving image data is determined to be the last moving image data in the moving image file (YES in step S412), the processing proceeds to step S801.

In step S801, the moving image file restoration unit 14 generates the header of the restoration target moving image file using the restoration data read in step S800 and the recording length (the number of frames) of the normal moving image data incremented in step S411, This processing corresponds to the processing in step S403 in FIG. 4.

In step S802, the moving image file restoration unit 14 stores the moving image file generated in step S801 in the RAM 17, This processing corresponds to the processing in step S404 in FIG. 4.

Subsequently, the restoration control unit 24 performs the processing in step S405, and if the additional information file exists (YES in step S405), the additional information file restoration unit 15 performs the restoration processing on the additional information file in steps S406 and S407. Then, the moving image file restoration unit 14 performs the processing in step S408. The processing in steps S405 to S408 is similar to the processing in FIG. 4.

Subsequently, in step S803, the moving image file restoration unit 14 writes the header of the moving image file stored in the RAM 17 in step S802 as the header of the restoration target moving image file to the detachable storage medium 19. Then, the restoration data is deleted from the moving image file. This processing completes the restoration of the moving image file in the detachable storage medium 19. At the time of writing the header of the restored moving image file, in addition to recording of the header, the extension of the moving image file is changed to an extension indicating that the restoration is complete.

In step S804, the moving image file restoration unit 14 updates information about the restoration target moving image file in the management information file recorded in the detachable storage medium 19. Specifically, the recording length information about the restoration target moving image file in the management information file is updated with the recording length of the normal moving image data counted in step S411. If the processing in step S804 is completed, the restoration of the moving image file and the additional information file is terminated.

As described above, according to the second exemplary embodiment, the recording formats of the moving image file and the restoration data are different from those according to the first exemplary embodiment, but the restoration processing on the moving image file and the additional information file can be performed as with the first exemplary embodiment.

<Other Embodiment>

While the present disclosure has been described in the exemplary embodiments, the present disclosure is not limited to these specific exemplary embodiments and can be modified in various ways without departing from the gist of the present disclosure. The parts of the above-described exemplary embodiments may be appropriately combined.

For example, recording processing may be performed by switching between that according to the first exemplary embodiment and that according to the second exemplary embodiment depending on the setting of a moving image file format to be recorded or depending on the format of a moving image file to be restored. In other words, for the recording processing, the control unit 10 performs that of FIG. 3 for an MP4 format determined as the recording format or performs that of FIG. 7 for an MXF format determined. Further, for the restoration processing, the control unit 10 performs that of FIG. 4 for an MP4 file determined as the recording format of a restoration target moving image file, or performs that of FIG. 8 for an MXF file determined.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-108055, filed Jun. 29, 2021, which is hereby incorporated by reference herein in its entirety.

What is claimed is:

1. A processing apparatus comprising:
at least one memory and at least one processor which function as:
a moving image file restoration unit configured to restore a moving image file recorded on a storage medium, wherein the moving image file restoration unit determines a length of valid moving image data in the moving image file, generates a header of the moving image file including information about the length of the valid moving image data, stores the header of the moving image file in a random access memory of the processing apparatus to start restoration processing on the moving image file, and records the header stored in the random access memory as a header of the moving image file on the storage medium to complete the restoration processing on the moving image file;

an identification unit configured to identify an additional information file associated with the moving image file, the additional information file being recorded on the storage medium and being different from the moving image file;

an additional information file restoration unit configured to restore the additional information file associated with the moving image file, wherein the additional information file restoration unit generates a restored additional information file using the information about the length of the valid moving image data included in the header stored in the random access memory to start restoration processing on the additional information file and records the restored additional information file on the storage medium to complete the restoration processing on the additional information file; and a control unit configured to perform control such that the additional information file restoration unit starts the restoration processing on the additional information file associated with the moving image file after the moving image file restoration unit starts the restoration processing on the moving image file and before the restoration processing on the moving image file is completed, and the moving image file restoration unit completes the restoration processing on the moving image file after the restoration processing on the additional information file is completed.

2. The processing apparatus according to claim 1,
wherein the additional information file restoration unit restores the additional information file using the information about the length of the valid moving image data after the moving image file restoration unit determines the length of the valid moving image data in the moving image file, and wherein the moving image file restoration unit records the header generated using the information about the length of the valid moving image data as the header of the moving image file after the additional information file restoration unit completes restoration of the additional information file.

3. The processing apparatus according to claim 1, wherein the moving image file restoration unit deletes invalid moving image data from the moving image file and then records the header generated using the information about the length of the valid moving image data as the header of the moving image file.

4. The processing apparatus according to claim 1,
wherein the moving image file restoration unit restores a moving image file recorded in a detachable storage medium, and wherein the additional information file restoration unit restores an additional information file associated with the moving image file recorded in the detachable storage medium.

5. The processing apparatus according to claim 4, wherein the random access memory is configured to temporarily store data, wherein the moving image file restoration unit temporarily stores the information about the length of the valid moving image data in the random access memory, wherein the additional information file restoration unit reads the additional information file from the detachable storage medium and restores the additional information file by recording, in the detachable storage medium, an additional information file obtained by adding the information about the length of the valid moving image data stored in the random access memory to the read additional information file, and wherein the moving image file restoration unit records a header including the information about the length of the valid moving image data stored in the random access memory as the header of the moving image file in the detachable storage medium after the additional information file restoration unit completes restoration of the additional information file.

6. The processing apparatus according to claim 1, wherein the moving image file restoration unit restores the moving image file based on restoration data that is recorded at a time of starting recording of the moving image file and the information about the length of the valid moving image data.

7. The processing apparatus according to claim 6, wherein the moving image file restoration unit records the header generated using the information about the length of the valid moving image data as the header of the moving image file and then deletes the restoration data.

8. The processing apparatus according to claim 6, wherein the moving image file is a Moving Picture Experts Group-4 (MP4) file, and the restoration data is recorded as a file different from the moving image file.

9. The processing apparatus according to claim 6, wherein the moving image file is a Material Exchange Format (MXF) file, and the restoration data is recorded in the moving image file.

10. The processing apparatus according to claim 6,
wherein, in a case where a moving image file as a restoration target is an MP4 file, the moving image file restoration unit restores the moving image file based on restoration data included in a file different from the moving image file and the information about the length of the valid moving image data, and wherein, in a case where a moving image file as a restoration target is an MXF file, the moving image file restoration unit restores the moving image file based on restoration data included in the moving image file and the information about the length of the valid moving image data.

11. The processing apparatus according to claim 1, wherein the identification unit identifies the moving image file and the additional information file of which file names excluding extensions match with each other as files associated with each other.

12. The processing apparatus according to claim 1, wherein the additional information file is a file described in an Extensible Markup Language (XML) format.

13. The processing apparatus according to claim 1, wherein the additional information file is in a NewsML-G2 format standardized by International Press Telecommunications Council (IPTC).

14. A method for controlling a processing apparatus, the method comprising:
restoring a moving image file recorded on a storage medium, wherein the restoring the moving image file includes determining a length of valid moving image data in the moving image file, generating a header of the moving image file including information about the length of the valid moving image data, storing the header of the moving image file in a random access memory of the processing apparatus to start restoration processing on the moving image file, and recording the header stored in the random access memory as a header of the moving image file on the storage medium to complete the restoration processing on the moving image file;

identifying an additional information file associated with the moving image file, the additional information file being recorded on the storage medium and being different from the moving image file; and restoring the additional information file associated with the moving image file, wherein the restoring the additional information file includes generating a restored additional information file using the information about the length of the valid moving image data included in the header stored in the random access memory to start restoration processing on the additional information file and recording the restored additional information file on the storage medium to complete the restoration processing on the additional information file, wherein the restoration processing on the additional information file associated with the moving image file is started after the restoration processing on the moving image file is started and before the restoration processing on the moving image file is completed, and wherein the restoration processing on the moving image file is completed after the restoration processing on the additional information file is completed.

15. A non-transitory computer-readable storage medium storing a program for causing a computer to execute a method for controlling a processing apparatus apparatus, the method comprising:

restoring a moving image file recorded on a storage medium, wherein the restoring the moving image file includes determining a length of valid moving image data in the moving image file, generating a header of the moving image file including information about the length of the valid moving image data, storing the header of the moving image file in a random access memory of the processing apparatus to start restoration processing on the moving image file, and recording the header stored in the random access memory as a header of the moving image file on the storage medium to complete the restoration processing on the moving image file;

identifying an additional information file associated with the moving image file, the additional information file being recorded on the storage medium and being different from the moving image file; and restoring the additional information file associated with the moving image file, wherein the restoring the additional information file includes generating a restored additional information file using the information about the length of the valid moving image data included in the header stored in the random access memory to start restoration processing on the additional information file and recording the restored additional information file on the storage medium to complete the restoration processing on the additional information file, wherein the restoration processing on the additional information file associated with the moving image file is started after the restoration processing on the moving image file is started and before the restoration processing on the moving image file is completed, and wherein the restoration processing on the moving image file is completed after the restoration processing on the additional information file is completed.

* * * * *